May 26, 1970 G. V. McGAHA 3,514,171

DENTAL INSTRUMENT CABINET AND STORAGE MECHANISM

Filed July 15, 1968 4 Sheets-Sheet 1

INVENTOR:
GEORGE V. McGAHA

BY Parrott, Bell, Seltzer, Park & Gibson
ATTORNEYS

DENTAL INSTRUMENT CABINET AND STORAGE MECHANISM

Filed July 15, 1968 4 Sheets-Sheet 2

INVENTOR:
GEORGE V. McGAHA

BY Parrott, Bell, Seltzer, Park & Gibson
ATTORNEYS

INVENTOR:
GEORGE V. McGAHA

BY Parrott, Bell, Seltzer, Park & Gibson
ATTORNEYS

DENTAL INSTRUMENT CABINET AND STORAGE MECHANISM

INVENTOR:
GEORGE V. McGAHA

BY Parrott, Bell, Seltzer, Park & Gibson
ATTORNEYS

United States Patent Office 3,514,171
Patented May 26, 1970

3,514,171
DENTAL INSTRUMENT CABINET AND STORAGE MECHANISM

George V. McGaha, Charlotte, N.C., assignor to The Pelton & Crane Company, Charlotte, N.C., a corporation of North Carolina Filed July 15, 1968, Ser. No. 744,734
Int. Cl. A47f 5/08
U.S. Cl. 312—209 10 Claims

ABSTRACT OF THE DISCLOSURE

A dental instrument cabinet and storage mechanism adapted to contain a plurality of dental hand instruments and connecting hose means therefor and being characterized by separately carrying each instrument and hose means, providing easy access to each of the instruments when use thereof is desired and storing and substantially concealing the instruments and hose means when use thereof is not desired. The mechanism includes a stationary housing including vertically-extending access means on the front thereof, and unitary, partitioned, compartmented means providing a plurality of individual compartments adapted to separately and removably carry the instruments and connecting hose means such that each instrument may be manually withdrawn therefrom and replaced therein. The compartmented means is slidably mounted on the interior of the housing for horizontal linear movement to and from a storage position completely within the housing when use of the instruments is not desired to and from an access position protruding out of the housing when use and manual withdrawal of the instruments are desired.

This invention relates to a dental instrument cabinet and storage mechanism adapted to contain a plurality of dental hand instruments and connecting hose means therefor and being characterized by separately carrying each instrument and hose means, providing easy access to each of the instruments when use thereof is desired and storing and substantially concealing the instruments and hose means when use thereof is not desired.

Heretofore, it has been the normal practice in a dental office to use a cumbersome and complex dental equipment unit which generally included a plurality of swinging arms, belts, pulleys, shafts and spring loaded or weight loaded hoses with dental hand instruments attached at various positions thereon. Also, other dental instruments have been placed at various locations in the dental office and the dentist has found it quite awkward and indeed very difficult to obtain easy access for use of these various dental instruments.

Additionally, it has become the current trend in recent times in the practice of dentistry to allow the patient to recline to any inclination desired by the dentist from a vertical position to a horizontal position, preferably in the almost completely horizontal position, and to have the dentist seated or standing adjacent the dental chair on one side thereof and the dental assistant seated or standing on the opposite side thereof. With these positions by the dentist and by the dental assistant, the prior overhead dental stand and random location of dental instruments throughout the office have been found to be quite burdensome to the dentist and to his assistant in the use of these hand instruments on the patient. Moreover, the appearance of these dental instruments, particularly the overhead stand, has through the years been quite frightening to the dental patients and has provided an undesirable atmosphere in the dentist's office.

Accordingly, it is the object of the present invention to provide a unitary dental instrument cabinet and storage mechanism adapted to contain a plurality of dental hand instruments and connecting hose means therefor which is characterized by separately carrying each instrument and hose means, providing easy access to each of the instruments when use thereof is desired by either the dentist or the dental assistant and storing and substantially concealing the instruments and hose means when use thereof is not desired so as to provide a pleasing appearance and atmosphere in the dentist's office.

The above object is accomplished by this invention by providing a dental instrument cabinet and storage mechanism comprising a stationary housing having top, bottom and side portions and including vertically-extending access means on the front thereof for providing access to the interior of the housing and unitary, partitioned, compartmented means providing a plurality of individual compartments adapted to separately and removably carry the instruments and connecting hose means such that each instrument may be manually withdrawn therefrom and replaced therein. The compartmented means is slidably mounted on the interior of the housing for horizontal linear movement to and from a storage position completely within the housing when use of the instruments is not desired to and from an access position protruding out of the housing when use and manual withdrawal of the instruments are desired.

The mechanism of this invention preferably includes an actuating means mounted in each of the compartments and adapted to be operatively associated with the instruments for actuating the instruments when the instruments are manually withdrawn from the compartments for use by the dentist or dental assistant.

Some of the objects and advantages having been stated, other objects and advantages will appear as the description proceeds when taken in conjunction with the accompanying drawings, in which.

Figures 1, 2, 3:
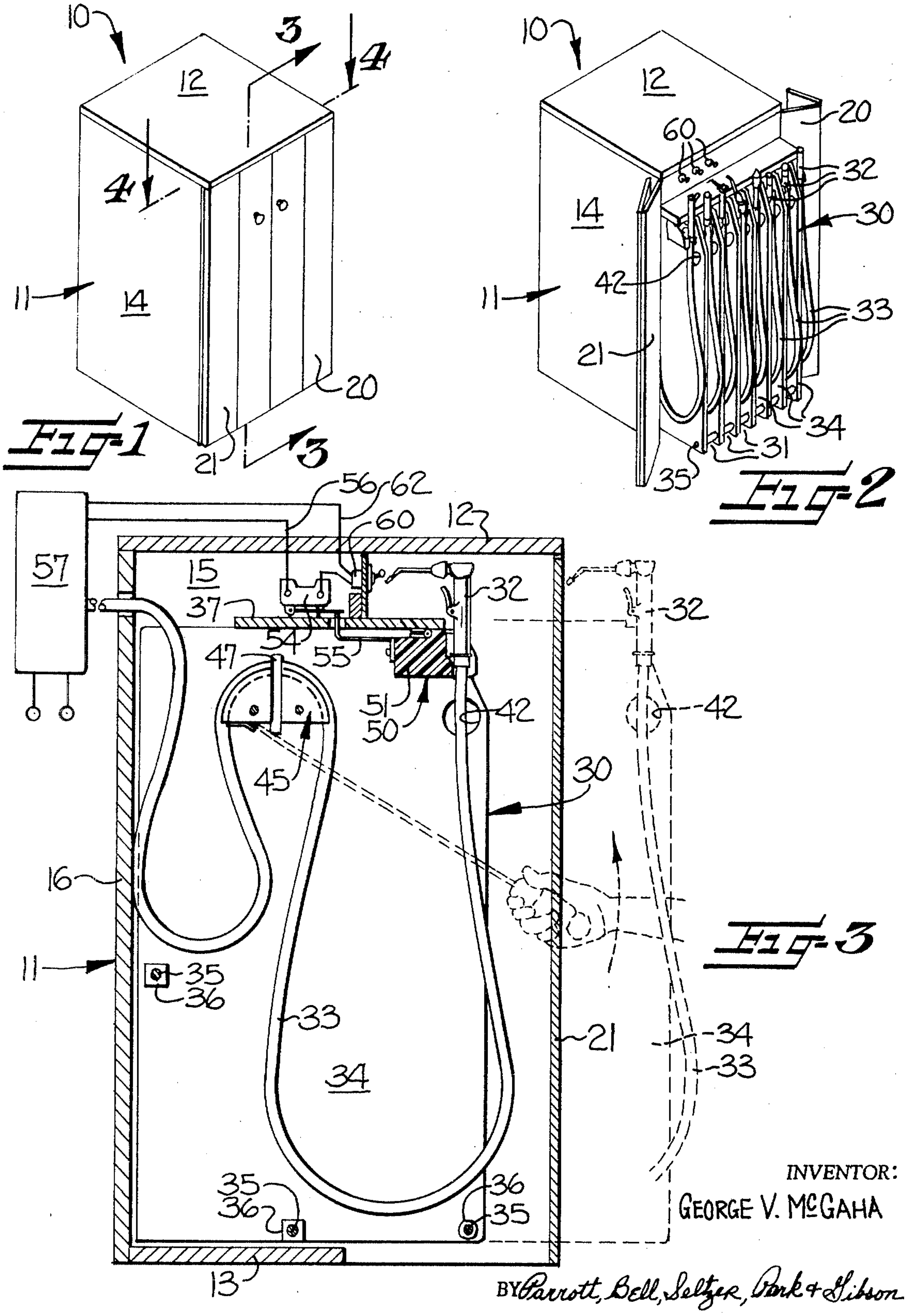
FIG. 1 is a perspective view of the dental instrument cabinet and storage mechanism of this invention in the storage position thereof.
FIG. 2 is a perspective view of the dental instrument cabinet and storage mechanism in the access position thereof.
FIG. 3 is an enlarged, vertical, sectional view taken substantially along the line 3—3 of FIG. 1.
Figure 4:
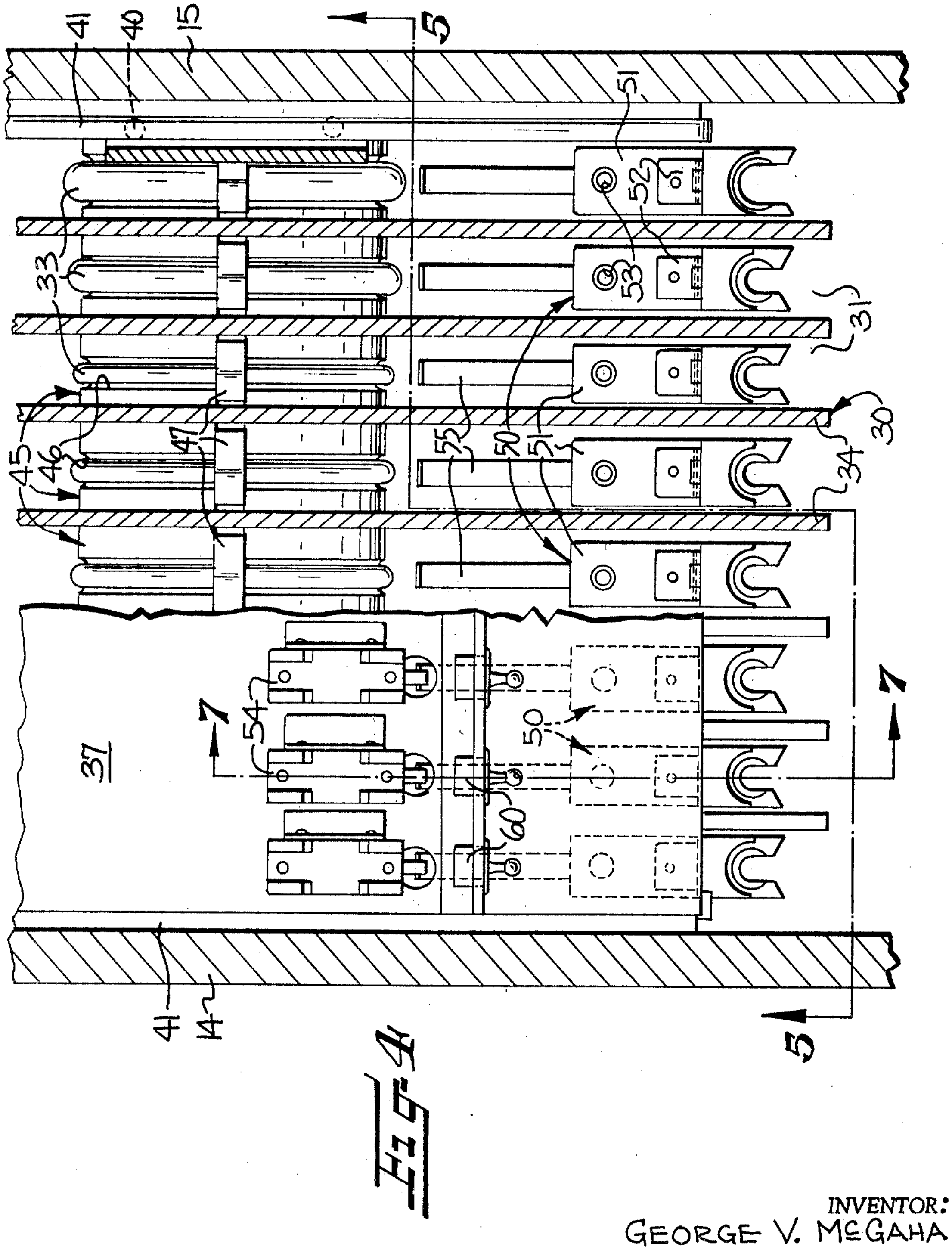
FIG. 4 is an enlarged, horizontal, sectional view, broken away, taken substantially along the line 4—4 of FIG. 1.
Figure 5:
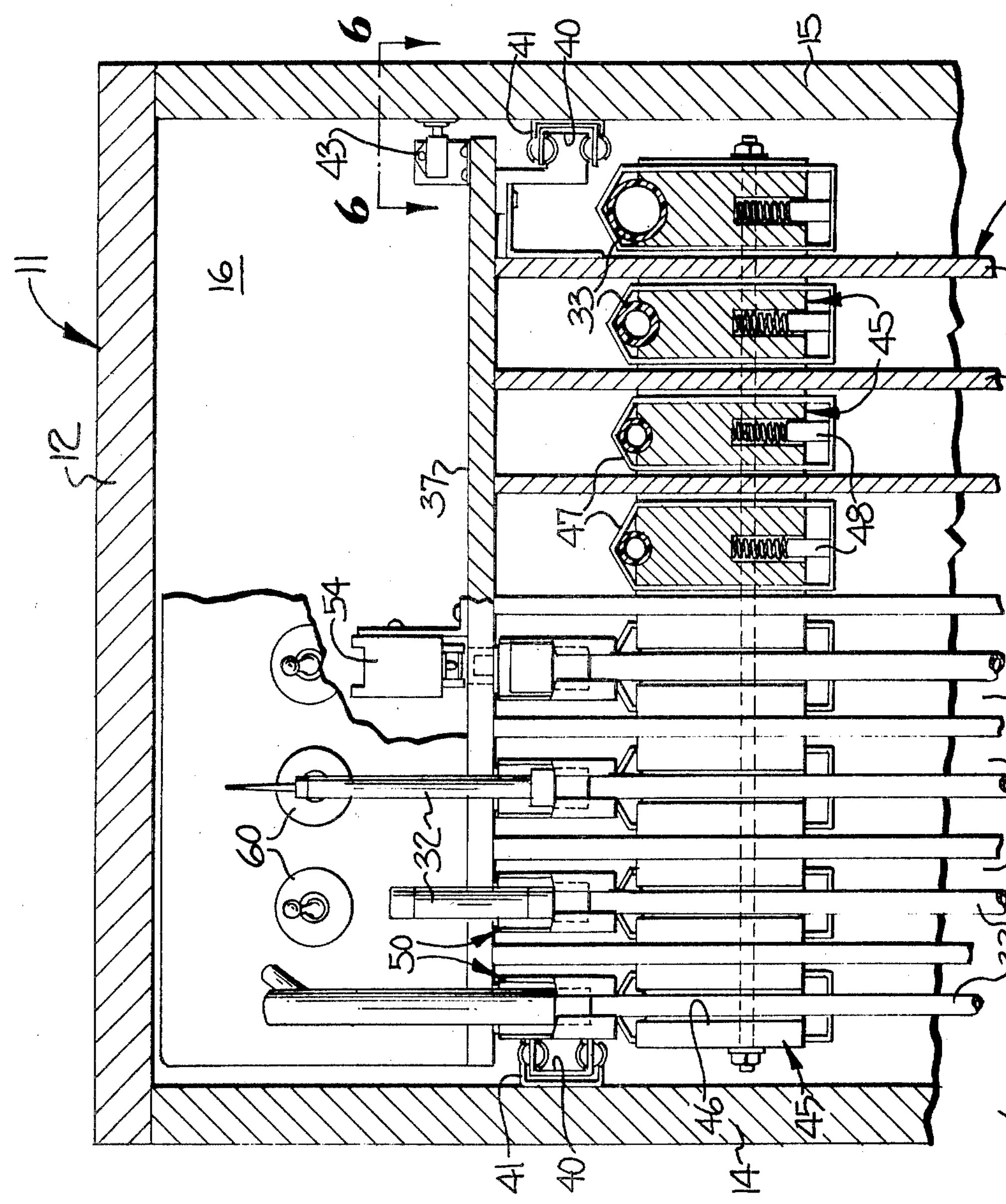
FIG. 5 is a partial, vertical, sectional view taken substantially along the line 5—5 of FIG. 4.

Referring now to the drawings, the dental instrument cabinet and storage mechanism is referred to generally in FIGS. 1 and 2 by the reference numeral 10. The cabinet and storage mechanism 10 comprises a stationary housing 11 having a top portion 12, bottom portion 13, side portions 14 and 15, and a back portion 16. The stationary housing 11 further includes a vertically-extending access means on the front thereof for providing access to the interior of the housing 11.

This access means comprises a pair of vertically-extending movable door means 20 and 21 suitably secured to the front of the housing 11 and adapted to assume an open position, as illustrated in FIG. 1.

The dental instrument cabinet and storage mechanism 10 further includes unitary, partitioned, compartmented means 30 providing a plurality of indidividual vertically-extending compartments 31 adapted to separately and removably carry a plurality of dental hand instruments 32 and connecting hose means 33 therefor such that each instrument 32 may be manually withdrawn from the compartments 31 and replaced therein.

The compartmented means 30 comprises a plurality of vertically-extending plates 34 positioned in spaced, side-by-side relationship to form the plurality of separate compartments. These plates 34 are secured together in the spaced, side-by-side rlationship by rods 35 extending horizontally through the plates 34 and having spacer blocks 36 spaced therealong between the plates 34. Also, a top plate 37 is secured to the top of the plates 34 and provides additional stabilization thereto.

Figure 6:
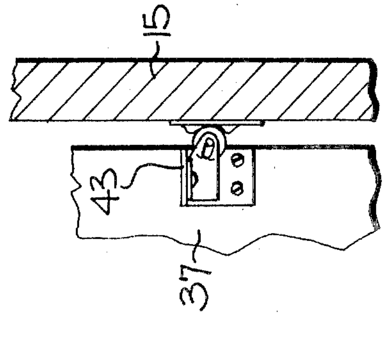
FIG. 6 is an enlarged, sectional, detail view of a latch mechanism taken substantially along the line 6—6 of FIG. 5.
Figure 8:
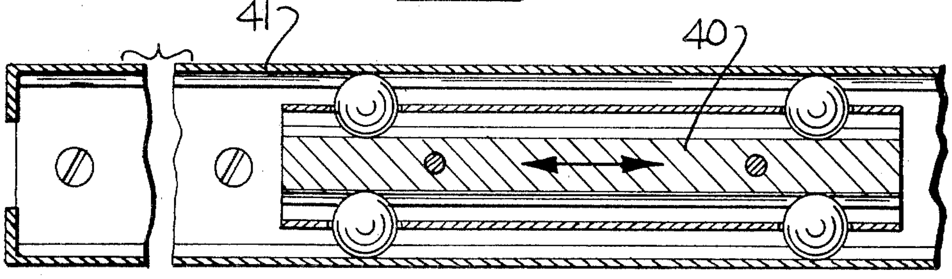
FIG. 8 is an enlarged, vertical, sectional, detail view of a roller and track means.
Figure 9:
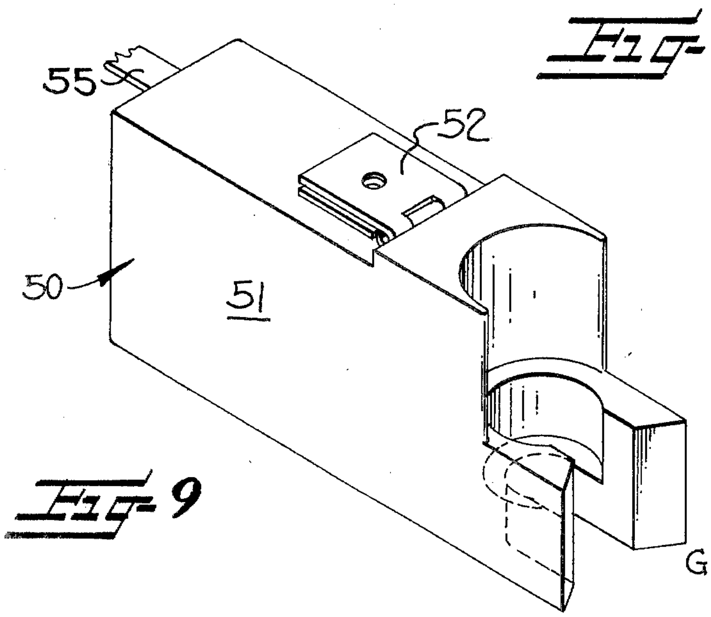
FIG. 9 is an enlarged, perspective view of a dental instrumental holder means utilized in this invention.

The compartmented means 30 is mounted and suspended within the stationary housing 11 by any suitable roller means 40 and track means 41, as may be seen specifically in FIGS. 6 and 8. As shown therein, a roller means 40 is secured to the compartmented means 30 at each side adjacent the top thereof and an elongate mating track means 41 is secured to the inside of the sides 14 of the stationary housing 11 such that the compartmented means 30 is adapted for horizontal linear movement from and to a storage position within the stationary housing 11, as shown in FIG. 1, from and to an access position protruding from the stationary housing 11, as shown in FIG. 2. For purposes of manually effecting the above horizontal movement, an aperture 42 is provided in all of the plates 34 of sufficient size to accommodate the fingers of the dentist or dental assistant.

Figure 7:
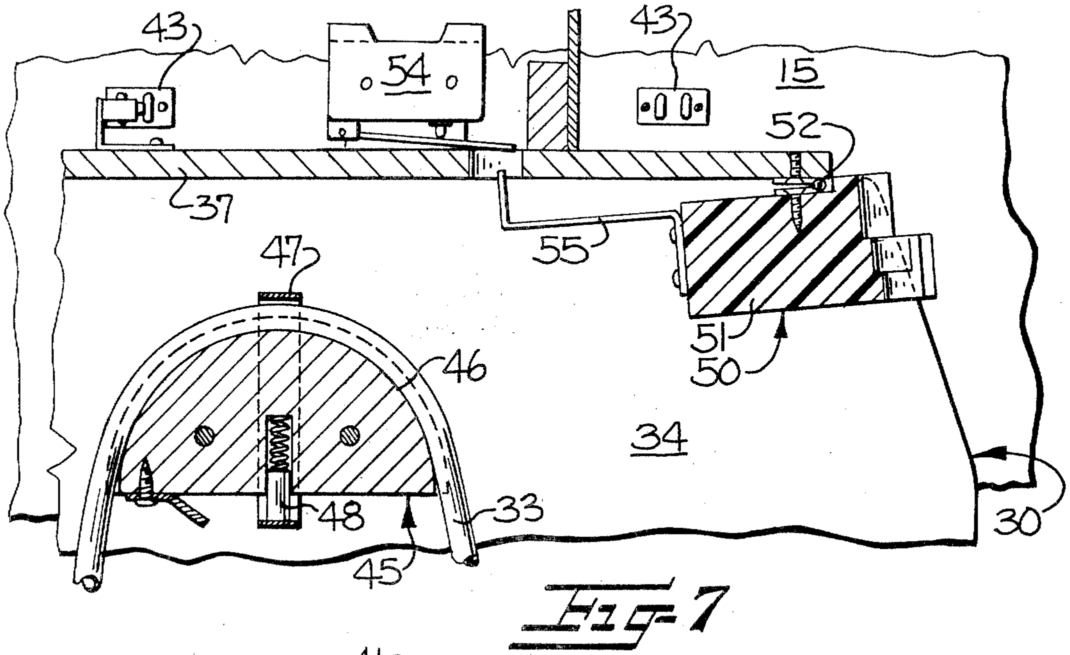
FIG. 7 is a partial, vertical, sectional view taken substantial along the line 7—7 of FIG. 4.

Cooperating with the roller and track means 40 and 41 is a latch mechanism, indicated broadly at 43 in FIG. 7, and adapted to temporarily latch the compartmented means 30 in the forward or access position and the rearward or storage position against random undesired movement.

The compartmented means 30 further includes a connecting hose retaining means 45 mounted in each of the compartments 31 in such a position so as to be adapted to receive a portion of the connecting hose 33 in the compartment 31 and allow the hose 33 to drape thereover and form a downwardly extending loop of excess hose between the retaining means 45 and the dental instrument 32, as shown particularly in FIG. 3, so that the dental instrument may be manually removed and withdrawn from the compartment 31 without dislodging the connecting hose from the retaining means 45.

The retaining means 45 is preferably in the shape of a half-moon and has a width corresponding to the width of the compartments 31 and a groove 46 therein along the periphery thereof for receiving a connecting hose 33 therein. The retaining means 45 further includes a retaining element 47 in the form of a hollow, rectangular-shaped bracket extending around the retaining means 45 and including spring biasing means 48 extending from a bore within the half-moon shaped retaining means to the bottom of the rectangular bracket 47 such that the upper portion of the bracket 47 is biased downwardly against the peripheral groove 46 to retain the connecting hose means 33 within the peripheral groove of the retaining means.

In the event additional connecting means is desired in the aforesaid downwardly-extending loop, an adjustment can easily be made by manually inserting a screwdriver or other suitable means under the spring-biased rectangular bracket 47 and moving same against the bias of the biasing means 48, as illustrated in FIG. 3, to relieve the gripping engagement of the connecting hose means by the bracket 47.

The dental instrument cabinet and storage mechanism 10 further includes actuating means 50 mounted in each of the compartments 31 and adapted to be operatively associated with the dental instruments 32 for actuating the instruments when same are manually withdrawn from the compartments 31 for use.

The actuating means 50 comprises a holder member 51 having an open slotted front end thereon adapted to removably receive a dental instrument 32 therein and being pivotally mounted off center by hinge member 52 on the bottom front side of plate 37 so that the holder member 51 by its own weight will assume the position illustrated in FIG. 7.

By the above arrangement, the holder member 51 is adapted to assume a first position, as illustrated in FIG. 3, against the bias of its own weight when a dental instrument is received within the holder member 51 and a second position, as illustrated in FIG. 7, by the bias of its own weight when the dental instrument is removed therefrom.

The actuating means 50 further comprises an electrical switch means 54 mounted on top of the plate 37 and adapted to be actuated by an arm 55 attached to the holder member 51. The arm 55 is in contact with the switch 54 when the holder member 51 is in the aforesaid first position and is inactive when thus engaged. When the dental instrument 32 is removed from the holder member 51, the arm 55 falls down out of engagement with the switch 54 which actuates the switch 54.

The switch 54 is suitably electrically connected by any suitable electrical connection, indicated schematically in FIG. 3 at 56, to a power source, indicated schematically in FIG. 3 at 57, which is in turn connected to the connecting hose means 33 for powering the dental instruments 32.

Accordingly, when the dental instrument 32 is removed from the holder member 51, the switch 54 will be actuated which in turn will actuate a power source 57 through the electrical connection 56 to power the dental instrument 32 through the connecting hose 33. The connecting hose 33 may carry any desired form of power, such as air, water or electricity.

The actuating means may also further include override switch means 60 mounted on an upstanding plate 61 extending vertically upwardly from and attached to the plate 37. The override switch 60 is suitably electrically connected to the electrical connection 56 by a connection 62 such that when the switch 60 is in one position thereof the electrical circuit to the power source 57 will be inoperative regardless of the position of the switch 54 and in another position thereof, will allow actuation of the power source 57 through the switch 54. Accordingly, when the override switch 60 is placed manually in one position thereof, it will prevent actuation of the dental instrument 32 when same is removed from the holder member 51 to allow repair and replacement of the components thereof and is adapted in another position to allow normal operation of the actuating means 50 when the dental instrument is removed from the holder member 51 for normal use.

In use of the above-described dental instrument cabinet and storage mechanism the dentist or dental assistant, when use of the dental instruments is desired, may simply open the doors 20 and 21 on the access means to the stationary cabinet 11 and manually withdraw the compartmented means 30 from the stationary cabinet 11 to the position shown in FIG. 2. Thereafter, a particular dental instrument 32 may be selected and may be manually withdrawn from the holder member 51 for use on a patient. Withdrawal of the dental instrument from the compartmented means is allowed by the excess loop of connecting means 33. The dental instrument 32 will be actuated when withdrawn from the holder member 51 by the above-described actuating means 50 and is ready for use on the patient. When the dental instrument has been used, it may be replaced in the holder member 51 which will deactivate the dental instrument and the compartmented means 30 may be pushed back into the stationary cabinet 11 and the doors 20 and 21 closed to conceal the dental instruments within the cabinet and storage mechanism 10 and away from the view of the patient.

In the drawings and specification, there has been set forth a preferred embodiment of this invention and, although specific terms are employed, they are used in a generic and descriptive sense only and not for purposes of limitation, the scope of the invention being defined in the appended claims.

What is claimed is:

1. A dental instrument cabinet and storage mechanism adapted to contain a plurality of dental hand instruments and connecting hose means therefor, said mechanism being characterized by separately carrying each instrument and hose means, providing easy access to each of the instruments when use thereof is desired and storing and substantially concealing the instruments and hose means when use thereof is not desired; said mechanism comprising:

(a) a stationary housing means having top, bottom, back and side portions and including vertically-extending access means on the front thereof for providing access to the interior of said housing means; and (b) unitary, partitioned, compartmented means providing a plurality of individual compartments for separately and removably carrying the instruments and connecting hose means such that each instrument and connecting hose means may be manually withdrawn therefrom and replaced therein, said compartmented means being slidably mounted on the interior of said housing for horizontal linear movement carrying the instruments and connecting hose means to and from a storage position completely within said housing when use of the instruments is not desired to and from an access position protruding out of said housing when use and manual withdrawal of the instruments are desired.

2. A dental instrument cabinet and storage mechanism as set forth in claim 1, in which said access means comprises vertically-extending movable door means on the front of said housing adapted to assume a closed position when said compartmented means is in said storage position for concealing the dental instruments and to assume an open position for providing access to the dental instruments when desired.

3. A dental instrument cabinet and storage mechanism, as set forth in claim 1, in which said mechanism includes an actuating means mounted in each of said compartments and adapted to be operatively associated with the instruments for actuating the instruments when the instruments are manually withdrawn from said compartments for use.

4. A dental instrument cabinet and storage mechanism, as set forth in claim 3, in which each of said acting means comprises a holder means adapted to removably receive the dental instrument and being pivotally mounted on said compartmented means for assuming a first position when the dental instrument is received therein and a second position when the dental instrument is removed therefrom, and a switch means operatively associated with the dental instrument and with said holder means and adapted to be energized to actuate the dental instrument only when the instrument is removed from said holder means and said holder means assumes said second position.

5. A dental instrument cabinet and storage mechanism, as set forth in claim 4, in which said actuating means further includes override switch means for selective ones of said individual actuating means, said override switch means being adapted in one position thereof to prevent actuation of the dental instrument when removed form said holder to allow repair and replacement of components of the instrument and adapted in another position thereof to allow normal operation of said actuating means when the dental instrument is removed from the holder for normal use.

6. A dental instrument cabinet and storage mechanism, as set forth in claim 1, in which said compartmented means includes a plurality of vertically-extending plate means secured together in spaced, side-by-side relationship to form said plurality of separate compartments, and roller and truck means secured to said housing and said compartmented means for mounting said compartmented means in suspended position within said housing for horizontal linear movement.

7. A dental instrument cabinet and storage mechanism, as set forth in claim 6, in which said compartmented means further includes a connecting hose retaining means mounted in each of said compartments in such a position as to be adapted to receive a portion of the connecting hose in said compartment and allow the hose to drape thereover and form a downwardly-extending loop of excess hose between said retaining means and the dental instrument so that the dental instrument may be manually removed and withdrawn from said compartment without dislodging the connecting hose from said retaining means.

8. A dental instrument cabinet and storage mechanism, as set forth in claim 7, in which each of said retaining means includes a movable, spring-based clamp means adapted to clamp the connected hose on said retaining means and adapted for muaual movement against the bias to release the clamping engagement for repositioning or replacing of the connecting hose.

9. A dental instrument cabinet and storage mechanism adapted to contain a plurality of dental instruments and connecting hose means threfore, said mechanism being characterized by separately carrying each instrument and hose means, providing easy access to each of the instruments when use thereof is desired and storing and substantially concealing the instruments and hose means when use thereof is not desired; said mechanism comprising:

(a) a stationary housing means having top, bottom, back and side portions and including vertically extending access means on the front thereof for providing access to the interior of ssaid housing;

(b) unitary, partitioned, compartmented means providing a plurality of individual compartments adapted to separately and removably carry the instruments and connecting hose means such that each instrument may be manually withdrawn therefrom and placed therein, said compartmental means comprising (1) a plurality of vertically-extending plate means secured together in spaced, side-by-side relationship to form said plurality of separate compartments and (2) roller and track means secured to said housing and said compartmented means for mounting said compartment means in suspended position within said housing for horizontal linear movement to and from a storage position completely within said housing when use of instruments is not desired to and from an access portion protruding out of said housing when use and manual withdrawal of the instruments are desired;

(c) actuating means mounted in each of said compartments and adapted to be operatively associated with the instruments for actuating the instruments when the instruments are manually withdrawn from said compartments for use, each of said acting means comprising (1) a holder means adapted to removably receive the dental instrument and being pivotally mounted on said compartmented means for assuming a first position when the dental instrument is received therein and a second position when the dental instrument is removed therefrom and (2) a switch means operatively associated with the dental instrument and with said holder means and adapted to be energized to actuate the dental instrument only when the instrument is removed from said holder means and said holder assumes said second position.

10. A dental instrument cabinet and storage mechanism adapted to contain a plurality of dental instruments and connecting hose means, said mechanism being characterized by separately carrying each instrument and hose means, providing easy access to each of the instruments when use thereof is desired and storing and substantially concealing the instruments and hose means when use thereof is not desired; said mechanism comprising:

(a) a stationary housing means having top, bottom, back and side portions and including vertically-extending access means on the front thereof for providing access to the interior of said housing means, said access means comprising vertically-extending movable door means adapted to assume a closed position with an open position for providing access to the dental instruments when desired;

(b) unitary, partitioned, compartmented means providing a plurality of individual compartments adapted to separately and removably carry the instruments and connecting hose means such that each instrument may be manually withdrawn therefrom and replaced therein, said compartmented means comprising (1) a plurality of vertically-extending plate means secured together in spaced, side-by-side relationship to form said plurality of separate compartments, (2) roller and track means secured to said housing and said compartmented means for mounting said compartmented means in suspended position within said housing for horizontal linear movement and (3) a connecting hose retaining means mounted in each of said compartments in such a position as to be adapted to receive a portion of the connecting hose in said compartment and allow the hose to drape thereover and form a downwardly-extending loop of excess hose between said retaining means and the dental instrument so that the dental instrument may be manually removed and withdrawn from said compartment without dislodging the connecting hose from said retaining means; and (c) actuating means mounted in each of said compartments and adapted to be operatively associated with the instruments for actuating the instruments when the instruments are manually withdrawn from said compartments for use, each of said actuating means comprising (1) a holder means adapted to removable receive the dental instrument and being pivotally mounted on said compartmented means for assuming a first position when the dental instrument is received therein and a second position when the dental instrument is removed therefrom, (2) a switch means operatively associated with the dental instrument and with said holder means and adapted to be energized to actuate the dental instrument only when the instrument is removed from said holder means and said holder means assumes said second position and (3) override switch means for selective ones of said individual actuating means, said override switch means being adapted in one position thereof to prevent actuation of the dental instrument when removed from said holder to allow repair and replacement of components of the instrument and adapted in another position thereof to allow normal operation of said actuating means when the dental instrument is removed from the holder for normal use.

References Cited

UNITED STATES PATENTS

| | | | |
|---|---|---|---|
| 2,840,432 | 6/1958 | Lauterbach | 312—209 |
| 3,180,585 | 4/1965 | Pusey et al. | 312—209 X |
| 3,190,712 | 6/1965 | Fielden | 312—311 |
| 3,280,462 | 10/1966 | Deeley | 32—22 |
| 3,371,975 | 3/1968 | Meltzer | 312—236 |

CASMIR A. NUNBERG, Primary Examiner

U.S. Cl. X.R.

32—22; 312—223

UNITED STATES PATENT OFFICE

CERTIFICATE OF CORRECTION

Patent No. 3,514,171 Dated May 26, 1970

Inventor(s) George V. McGaha

It is certified that error appears in the above-identified patent and that said Letters Patent are hereby corrected as shown below:

Column 3, line 3, "indidividual" should be --individual--; line 13, "rlationship" should be --relationship--. Column 5, line 73, "form" should be --from--. Column 6, line 9, "truck"should be --track--; line 26, "spring-based" should be --spring-biased--; line 27, "connected" should be --connecting--; line 28, "muaual" should be --manual--; line 33, "threfore" should be --therefor--; line 43, "ssaid" should be --said--; line 49, "compartmental" should be --compartmented--; line 60, after "of" insert --the--; lines 61 and 62, "portion" should be --position--; line 69, "acting" should be --actuating--. Column 7, line 8, after "holder" insert --means--; line 23, "with" should be --and--. Column 8, line 11, "removable" should be --removably--; line 40, under "References Cited", "10%1966" should be --10/1966--.

SIGNED AND SEALED
SEP 22 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
U.S. GOVERNMENT PRINTING OFFICE : 1969 O—366-334